US011915891B2

(12) United States Patent
Zheng et al.

(10) Patent No.: US 11,915,891 B2
(45) Date of Patent: Feb. 27, 2024

(54) SWITCH ASSEMBLY AND VEHICLE

(71) Applicant: NIO TECHNOLOGY (ANHUI) CO., LTD, Hefei (CN)

(72) Inventors: Jiawen Zheng, Hefei (CN); Lv Li, Hefei (CN); Chenguang Geng, Hefei (CN); Rui Zhang, Hefei (CN); Mingzhi Tong, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 0 days.

(21) Appl. No.: 17/570,930

(22) Filed: Jan. 7, 2022

(65) Prior Publication Data

US 2022/0223359 A1 Jul. 14, 2022

(30) Foreign Application Priority Data

Jan. 8, 2021 (CN) ......................... 202110023722.9

(51) Int. Cl.
*H01H 21/36* (2006.01)
*H01H 21/22* (2006.01)

(52) U.S. Cl.
CPC ............ *H01H 21/36* (2013.01); *H01H 21/22* (2013.01)

(58) Field of Classification Search
CPC ........ H01H 21/36; H01H 21/22; H01H 21/04; H01H 3/04; H01H 71/10; H01H 21/24; H01H 2221/016; F16H 59/04

(Continued)

(56) References Cited

U.S. PATENT DOCUMENTS

2016/0188928 A1* 6/2016 Blackwood ............ H01H 9/168 340/10.1
2018/0094720 A1* 4/2018 Colom .................... F16H 61/24
2019/0108954 A1* 4/2019 Kobayashi ............. H01H 23/04

FOREIGN PATENT DOCUMENTS

DE 102013003575 9/2014
DE 202021105091 * 9/2021 ............. H01H 23/04
EP 3041012 7/2016

OTHER PUBLICATIONS

Extended Search Report for European Patent Application No. 22150513.4, dated Jun. 9, 2022, 8 pages.

* cited by examiner

*Primary Examiner* — Edwin A. Leon
*Assistant Examiner* — Iman Malakooti
(74) *Attorney, Agent, or Firm* — Sheridan Ross P.C.

(57) ABSTRACT

This application provides a switch assembly and a vehicle. The switch assembly comprises: a first housing; a plurality of key shifter levers, the key shifter levers each comprising a first end and a second end, a pin shaft being connected to the key shifter lever between the first end and the second end, the key shifter lever extending from the first end to the second end, and the key shifter lever being configured to pivot in a radial plane with the shaft pin as a center, wherein the second end extends to the outside of the first housing; a second housing, the second housing surrounding the first end of the key shifter lever and having a first limiting surface located above the key shifter lever and a second limiting surface located below the key shifter lever; and a first push rod and a second push rod, the first push rod and the second push rod being arranged in the radial plane and respectively corresponding to the first limiting surface and the second limiting surface, and the first push rod and the second push rod leaning on the key shifter lever between the first end and (Continued)

the shaft pin, wherein at least one of the first push rod and the second push rod is always kept in contact with the first limiting surface or the second limiting surface by setting a dimension relationship.

8 Claims, 1 Drawing Sheet

(58) Field of Classification Search
USPC ......... 200/50.33, 50.35, 248, 335, 339, 553, 200/557
See application file for complete search history.

SWITCH ASSEMBLY AND VEHICLE

CROSS-REFERENCE TO RELATED APPLICATION

This application claims the benefit of Chinese Patent Application No. 202110023722.9 filed Jan. 8, 2021, the entire contents of which are incorporated herein by reference in its entirety.

TECHNICAL FIELD

This application relates to the field of vehicle switch structures. More specifically, this application relates to a switch assembly, which provides an improved structural design. This application further relates to a vehicle comprising the foregoing switch assembly.

BACKGROUND ART

Vehicles are usually provided with multi-key toggle switches. For example, a control key of a vehicle air conditioner can be implemented by a switch assembly. Keys in a typical multi-key toggle switch are manufactured, assembled and positioned separately. Positioning of a key shifter lever may be implemented, for example, through the structure of a push rod and a rubber pad. To accurately position the key shifter lever, a plurality of dimension relationships associated with the push rod and force of each rubber pad need to be considered. For example, a flush needs to be adjusted by using the dimension relationships, and the dimension relationships need to be adjusted by repairing a mold many times in a later stage.

SUMMARY OF THE INVENTION

According to one aspect, an objective of this application is to provide a switch assembly, which aims to provide a convenient and reliable solution for dimension relationship of the switch assembly. According to another aspect, an objective of this application is to provide a vehicle comprising the foregoing switch assembly.

The objectives of this application are achieved by the following technical solutions:

a switch assembly, comprising:

a first housing;

a plurality of key shifter levers, the key shifter levers each comprising a first end and a second end, a pin shaft being connected to the key shifter lever between the first end and the second end, the key shifter lever extending from the first end to the second end, and the key shifter lever being configured to pivot in a radial plane with the shaft pin as a center, wherein the second end extends to the outside of the first housing;

a second housing, the second housing surrounding the first end of the key shifter lever and having a first limiting surface located above the key shifter lever and a second limiting surface located below the key shifter lever; and a first push rod and a second push rod, the first push rod and the second push rod being arranged in the radial plane and respectively corresponding to the first limiting surface and the second limiting surface, and the first push rod and the second push rod leaning on the key shifter lever between the first end and the shaft pin, wherein at least one of the first push rod and the second push rod is always kept in contact with the first limiting surface or the second limiting surface by setting a dimension relationship.

In the foregoing switch assembly, optionally, the first push rod is installed at the first limiting surface and extends by a first distance from the first limiting surface toward the key shifter lever, and the second push rod is installed at the second limiting surface and extends by a second distance from the second limiting surface toward the key shifter lever; and the sum of the first distance, the second distance and a thickness of the key shifter lever is configured to be greater than a distance between the first limiting surface and the second limiting surface.

In the foregoing switch assembly, optionally, thrust applied by the first push rod to the key shifter lever is equal to thrust applied by the second push rod to the key shifter lever.

In the foregoing switch assembly, optionally, the switch assembly further comprises a first rubber pad and a second rubber pad, the first rubber pad and the second rubber pad respectively matching the first push rod and the second push rod, the first rubber pad being configured to push the first push rod toward the key shifter lever, and the second rubber pad being configured to push the second push rod toward the key shifter lever, wherein a second prepressure provided by the second rubber pad exceeds a predetermined value than a first prepressure provided by the first rubber pad.

In the foregoing switch assembly, optionally, the second rubber pad pushes the second push rod toward the second limiting surface, and the second push rod is always kept in contact with the second housing in an initial zero state of the key shifter lever.

In the foregoing switch assembly, optionally, under the action of the second prepressure, the first push rod tends to be separated from the second housing, so that an initial interference amount between the first push rod and the key shifter lever is at least partially eliminated.

In the foregoing switch assembly, optionally, the predetermined value is between 0.3 N and 2 N.

In the foregoing switch assembly, optionally, the shaft pin is located between the first housing and the second housing.

In the foregoing switch assembly, optionally, the shaft pin extends through a plurality of key shifter levers, so that the key shifter levers have a common pivotal axis.

A vehicle, comprising the foregoing switch assembly.

BRIEF DESCRIPTION OF THE DRAWINGS

This application is further described in detail below with reference to drawings and preferred embodiments. Those skilled in the art shall understand that these drawings are drawn only for the purpose of explaining the preferred embodiments, and therefore should not be used as a limitation on the scope of this application. In addition, unless otherwise specified, the drawings are merely intended to conceptually represent the composition or configuration of the described objects, and may contain exaggerated display. The drawings are not necessarily drawn to scale.

DETAILED DESCRIPTION OF EMBODIMENTS

Figure 1:
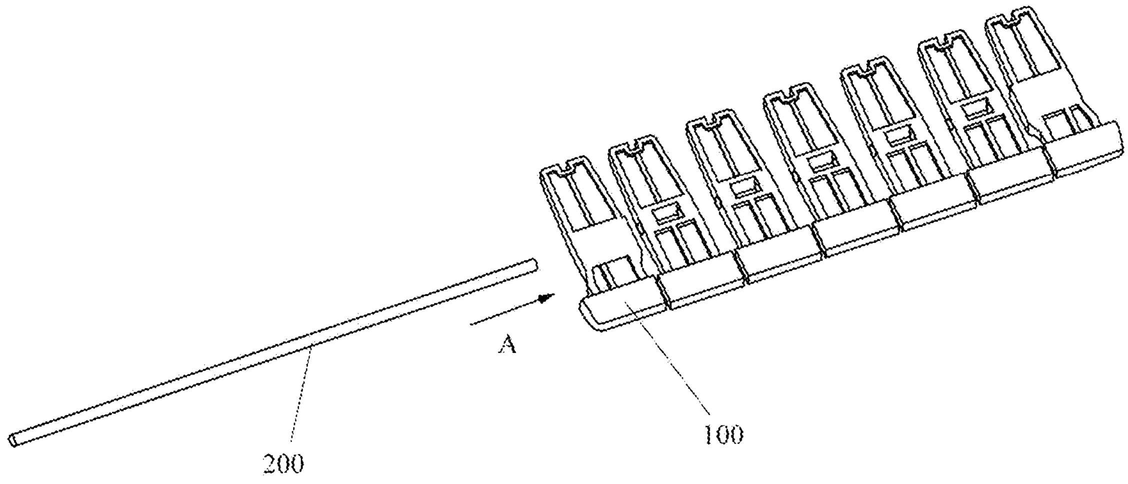
FIG. 1 is a perspective view of an embodiment of a key shifter lever and a shaft pin according to this application.

Preferred embodiments of this application will be described below in detail with reference to the drawings. It shall be understood by those skilled in the art that these descriptions are merely illustrative and exemplary, and should not be construed as limiting the scope of protection of this application.

First, it should be noted that the orientation terms, such as top, bottom, upward, and downward, that are described herein are defined relative to the directions in each drawing. These orientations are relative concepts, and therefore will change according to their positions and states. Therefore, these or other orientation terms should not be construed as limiting.

In addition, it should also be noted that any single technical feature described or implied in the embodiments herein, or any single technical feature shown or implied in the drawings, or equivalents thereof can continue to be combined, so as to obtain other embodiments which are not directly mentioned herein.

It should be noted that in different drawings, the same reference numerals denote the same or substantially the same components.

FIG. 1 is a perspective view of an embodiment of a key shifter lever and a shaft pin according to this application. As shown in the figure, a switch assembly according to this application may comprise a plurality of key shifter levers 100, and the key shifter levers 100 may have a common shaft pin 200. The shaft pin 200 extends through each key shifter lever 100 in a direction indicated by an arrow A, thereby limiting a pivot center of each key shifter lever 100 in the direction indicated by the arrow A. In this way, consistency of the dimension and coaxiality of the shaft pin of the key shifter levers is ensured, so that a deviation quantity of each key shifter lever in all directions is ensured, and the dislocation of the key shifter lever caused by accumulated tolerance of dimension is reduced.

In an embodiment, the shaft pin 200 may be made of metal, including but not limited to iron, stainless steel, copper, and the like. In a further embodiment, the key shifter lever 100 may be made of any suitable material, including but not limited to plastic, and the like.

Figure 2:
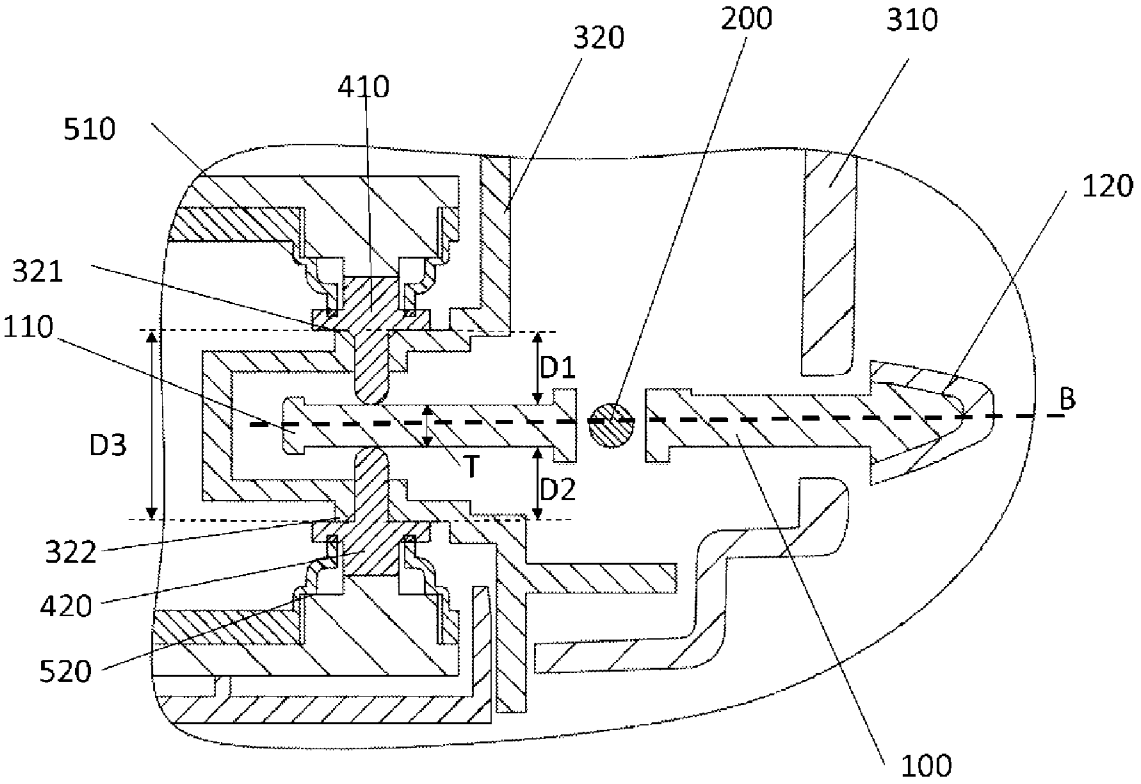
FIG. 2 is a partial schematic cross-sectional view of an embodiment of a switch assembly according to this application.

FIG. 2 is a partial schematic cross-sectional view of an embodiment of a switch assembly according to this application. As shown in the figure, the switch assembly includes a first housing 310 and a second housing 320. The shaft pin 200 is disposed between the first housing 310 and the second housing 320, and the key shifter lever 100 extends from a first end 110 to a second end 120. At least a part of the second housing 320 extends about the first end 110 of the key shifter lever 100, and the second end 120 of the key shifter lever 100 at least partially extends to the outside of the first housing 310. Therefore, the second end 120 of the key shifter lever 100 can be operated by a user outside the first housing 310. For example, the user can press the second end 120 of the key shifter lever 100 with a finger, so that the key shifter lever 100 tends to move clockwise about the shaft pin 200 in the state shown in FIG. 2.

Herein, the key shifter lever 100 is defined as pivoting about the shaft pin 200, and a direction in which the shaft pin 200 is located is defined as an axial direction. Accordingly, a plane perpendicular to the shaft pin 200 is defined as a radial direction. For example, the plane of paper in the state shown in FIG. 2 is the radial direction. In use, the key shifter lever 100 pivots about the shaft pin 200 in a radial plane.

The second housing 320 has a first limiting surface 321 and a second limiting surface 322. In the embodiment shown in the figure, the first limiting surface 321 is located above the key shifter lever 100, and the second limiting surface 322 is located below the key shifter lever 100. A first push rod 410 and a second push rod 420 are respectively installed on the first limiting surface 321 and the second limiting surface 322, and respectively extend toward the key shifter lever 100 by a first distance D1 and a second distance D2. Therefore, between the first end 110 and the shaft pin 200, the key shifter lever 100 is positioned between the first push rod 410 and the second push rod 420. The second push rod 420 is dimensioned in such a way that the second push rod is always kept in contact with the second limiting surface 322 in an initial zero state of the key shifter lever.

In an embodiment, the key shifter lever 100 forms a positioning relationship between the first push rod 410 and the second push rod 420, and at least one of the first push rod 410 and the second push rod 420 is always kept in contact with the limiting surface of the second housing 320 by using an ingenious design.

The initial zero state of the key shifter lever refers to a force balance state of the key shifter lever 100 without operation by a user. In this state, the first push rod 410 and the second push rod 420 apply force to the key shifter lever 100, so that the key shifter lever is in the position represented by a dotted line B in FIG. 2.

More specifically, as shown in the figure, the key shifter lever 100 has a thickness T, and the distance between the first limiting surface 321 and the second limiting surface 322 is D3. The sum of the first distance D1, the second distance D2 and the thickness T is greater than the distance D3 between the first limiting surface 321 and the second limiting surface 322. This can at least partially eliminate clearance wobble that may be caused by the tolerance of the distance D3. It is easy to understand that the distance D3 between the first limiting surface 321 and the second limiting surface 322 may be composed of two parts, that is, a distance from the first limiting surface 321 to a horizontal symmetry axis of the key shifter lever 100 (also referred to as a height of the first limiting surface) and a distance from the second limiting surface 322 to the horizontal symmetry axis of the key shifter lever 100 (also referred to as a height of the second limiting surface).

In an embodiment, the first push rod 410 and the second push rod 420 have the same height or extension length, in other words, the first push rod 410 and the second push rod 420 may be the same push rod. Through the technical solution of this application, a dimension relationship of the entire switch assembly can be adjusted only by adjusting the distance between the first limiting surface 321 and the second limiting surface 322 of the second housing 320.

In this way, the second push rod 420 is configured to be always kept in contact with the second limiting surface 322, and no undesired movement occurs. In this case, the key shifter lever 100 is also in a force balance state, that is, thrust applied by the first push rod 410 to the key shifter lever 100 is equal to thrust applied by the second push rod 420 to the key shifter lever 100. The height of the second push rod 420 is designed to be equal to the distance from the second limiting surface 322 to the surface of the key shifter lever 100. In this way, when the second push rod 420 is always attached to the second limiting surface 322, a top end of the second push rod 420 always remains at this position. The force from the first push rod 410 is not enough to push the second push rod 420, so that the second push rod 420 keeps the key shifter lever 100 at an absolute theoretical design zero position (that is, the position indicated by the dotted line B) as seen from a design state. In addition, in the presence of the foregoing dimension relationship, only the following five parameters need to be considered for a tolerance chain design of the switch assembly: the first distance D1 (that is, the height of the first push rod 410), the second distance D2 (that is, the height of the second push rod 420), the thickness T of the key shifter lever 100 (that is, the profile of the key shifter lever), the distance from the first limiting surface 321 to the horizontal symmetry axis of the key shifter lever 100 (that is, the height of the first limiting surface), and the distance from the second limiting surface 322 to the horizontal symmetry axis of the key shifter lever 100 (that is, the height of the second limiting surface).

In an embodiment, the thrust of the first push rod 410 is always less than the thrust of the second push rod 420 by using the design of asymmetric force. Therefore, the position of the second push rod 420 will not change, so that the height position of the second push rod 420 relative to the key shifter lever 110 becomes the only factor controlling the end position of the key shifter lever 120. In other words, only the dimension of this part needs to be controlled in production. It should be noted that the first push rod 410 and the second push rod 420 are actually the same components, and therefore only the relative height of the second limiting surface 322 relative to the key shifter lever 100 needs to be controlled. Therefore, through the solution of this application, uncertainty of the key flush in production (that is, the second end 120 of each key shifter lever 100 is positioned above or below the dotted line B and not at the same height) can be lowered, so that the key shifter levers 100 are kept centered along the dotted line B or deviate to one side of the dotted line B together. In this way, the flush between the key shifter levers 100 is improved.

An interference amount of the first push rod 410 in design is actually reflected as the distance where the first push rod is pushed away between the first push rod 410 and the first limiting surface 321 of the second housing 320. Through the dimension relationship of D1+D2>D3, clearance wobble caused when the dimension of the second push rod 420 (that is, the relative height of the second limiting surface 322 relative to the key shifter lever 100) is excessively small can be avoided.

In an embodiment, a first rubber pad 510 and a second rubber pad 520 respectively match the first push rod 410 and the second push rod 420, and assist in respectively positioning the first push rod 410 and the second push rod 420 on the first limiting surface 321 and the second limiting surface 322. The first rubber pad 510 applies a first predetermined pressure to the first push rod 410, and the second rubber pad 520 applies a second predetermined pressure to the second push rod 420. The second predetermined pressure may be greater than the first predetermined pressure, for example, by 0.3-2 N. In an embodiment, the second predetermined pressure is 0.5 N greater than the first predetermined pressure. The foregoing predetermined pressure ensures that the second push rod 420 is always in contact with the second housing 320 or the second limiting surface 322 during operation. At this time, the first push rod 410 is also affected by the difference between the foregoing predetermined pressures, and will be pushed to tend to be separated from the second housing 320 or the first limiting surface 321, so that an initial interference amount between the first push rod 410 and the key shifter lever 100 is at least partially eliminated. In an embodiment, the initial interference amount N is equal to the sum of the first distance D1, the second distance D2 and the thickness T minus the distance D3 between the first limiting surface 321 and the second limiting surface 322.

In this case, only the following three parameters need to be considered for a tolerance chain design of the switch assembly: the second distance D2 (that is, the height of the second push rod 420), the thickness T of the key shifter lever 100 (that is, the profile of the key shifter lever), and the distance from the second limiting surface 322 to the horizontal symmetry axis of the key shifter lever 100 (that is, the height of the second limiting surface). In this way, the tolerance chain design of the switch assembly is further simplified, and the number of tolerance chains that affect the flush is reduced to three, so that better dimensional control can be implemented.

This application further relates to a vehicle, comprising the switch assembly described above. In an embodiment, the switch assembly is disposed at an instrument panel of the vehicle.

The switch assembly and the vehicle according to this application have the advantages of simplicity, reliability, ease of implementation, convenience in use, and the like. The control over the flush of the switch assembly is improved.

This application is disclosed in this description with reference to the drawings, and those skilled in the art may further implement this application, including manufacturing and using any device or system, selecting suitable materials, and using any combined methods. The scope of this application is defined by the claimed technical solutions, and includes other examples conceivable by those skilled in the art. As long as such other examples include structural elements that do not differ from those described by the literal language of the claimed technical solutions or such other examples include equivalent structural elements which are not substantially different from those described by the literal language of the claimed technical solutions, such other examples should be considered to be within the scope of protection as determined by the claimed technical solutions of this application.

The invention claimed is:

1. A switch assembly, comprising:

a first housing;

a plurality of key shifter levers, the key shifter levers each comprising a first end and a second end, a shaft pin being connected to the key shifter lever between the first end and the second end, the key shifter lever extending from the first end to the second end, and the key shifter lever being configured to pivot in a radial plane with the shaft pin as a center, wherein the second end extends to the outside of the first housing;

a second housing, the second housing surrounding the first end of the key shifter lever and having a first limiting surface located above the key shifter lever and a second limiting surface located below the key shifter lever;

a first push rod and a second push rod, the first push rod and the second push rod being arranged in the radial plane and respectively corresponding to the first limiting surface and the second limiting surface, and the first push rod and the second push rod leaning on the key shifter lever between the first end and the shaft pin, wherein at least one of the first push rod and the second push rod is always kept in contact with the first limiting surface or the second limiting surface by setting a dimension relationship; and a first rubber pad and a second rubber pad, the first rubber pad and the second rubber pad respectively matching the first push rod and the second push rod, the first rubber pad being configured to push the first push rod toward the key shifter lever, and the second rubber pad being configured to push the second push rod toward the key shifter lever, wherein a second prepressure provided by the second rubber pad exceeds a predetermined value than a first prepressure provided by the first rubber pad.

2. The switch assembly according to claim 1, wherein the first push rod is installed at the first limiting surface and extends by a first distance from the first limiting surface toward the key shifter lever, and the second push rod is installed at the second limiting surface and extends by a second distance from the second limiting surface toward the key shifter lever; and the sum of the first distance, the second distance and a thickness of the key shifter lever is configured to be greater than a distance between the first limiting surface and the second limiting surface.

3. The switch assembly according to claim 2, wherein thrust applied by the first push rod to the key shifter lever is equal to thrust applied by the second push rod to the key shifter lever.

4. The switch assembly according to claim 1, wherein the second rubber pad pushes the second push rod toward the second limiting surface, and the second push rod is always kept in contact with the second limiting surface in an initial zero state of the key shifter lever.

5. The switch assembly according to claim 1, wherein under the action of the second prepressure, the first push rod tends to be separated from the second housing, so that an initial interference amount between the first push rod and the key shifter lever is at least partially eliminated.

6. The switch assembly according to claim 1, wherein the predetermined value is between 0.3 N and 2 N.

7. The switch assembly according to claim 2, wherein the shaft pin is located between the first housing and the second housing.

8. The switch assembly according to claim 1, wherein the shaft pin extends through a plurality of key shifter levers, so that the key shifter levers have a common pivotal axis.

* * * * *